United States Patent [19]

Robbins

[11] Patent Number: 4,704,660

[45] Date of Patent: Nov. 3, 1987

[54] HIGH-INTENSITY LIGHT SOURCE FOR A FIBER OPTICS ILLUMINATION SYSTEM

[75] Inventor: John A. Robbins, North Hollywood, Calif.

[73] Assignee: Lumenyte Corporation, Chatsworth, Calif.

[21] Appl. No.: 842,073

[22] Filed: Mar. 19, 1986

Related U.S. Application Data

[63] Continuation-in-part of Ser. No. 716,575, Mar. 27, 1985, abandoned.

[51] Int. Cl.$^4$ ............................................... F21V 7/04
[52] U.S. Cl. ...................................... 362/32; 362/294; 362/293
[58] Field of Search ................. 362/32, 293, 294, 804; 350/96.1; 40/547

[56] References Cited

U.S. PATENT DOCUMENTS

| | | |
|---|---|---|
| 3,638,013 | 1/1972 | Keller .............................. 362/32 X |
| 3,733,481 | 5/1973 | Kuyt ................................. 362/32 |
| 3,775,606 | 11/1973 | Bazell et al. ...................... 362/32 |
| 3,813,514 | 5/1974 | Canty .............................. 362/32 X |
| 4,025,779 | 5/1977 | Ahroni ............................. 362/32 |
| 4,425,599 | 1/1984 | Rieder et al. ..................... 362/32 |
| 4,454,568 | 6/1984 | Stadnik ............................. 362/32 |
| 4,569,334 | 2/1986 | Ohshiro ......................... 362/32 X |

FOREIGN PATENT DOCUMENTS 2140147 11/1984 United Kingdom ................. 362/32

Primary Examiner—Margaret A. Focarino
Attorney, Agent, or Firm—Thomas I. Rozsa

[57] ABSTRACT

A system comprising a high-intensity lamp, a focusing reflector for directing focused light into a light conduit (fiber optic), a rotating fan between the lamp and the light conduit is disclosed. The system may include a cooling duct that the fan blows through and an air inlet in the housing. Further embodiments may include a color wheel or rotating shutter. The system can use either glass or plastic light conduits.

34 Claims, 28 Drawing Figures

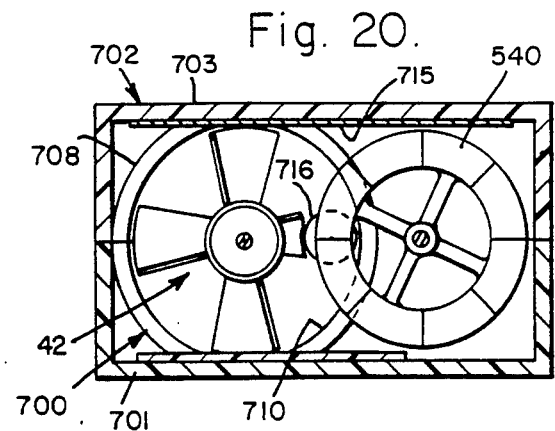
Fig. 20.
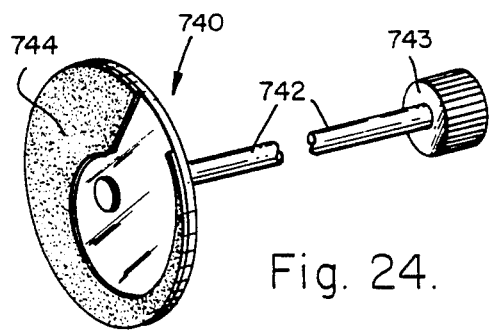
Fig. 24.
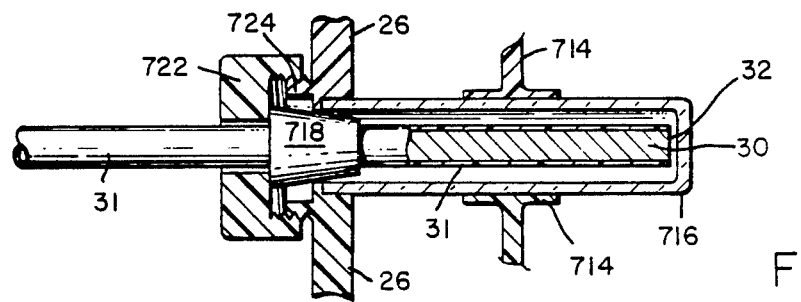
Fig. 21.
Fig. 22.
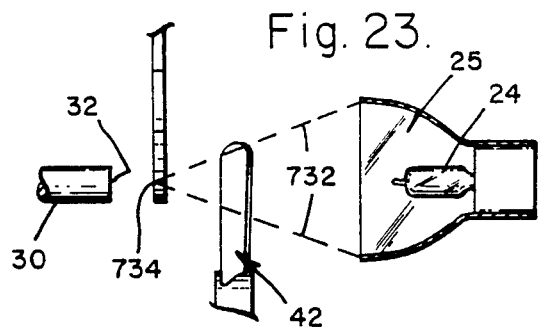
Fig. 23.
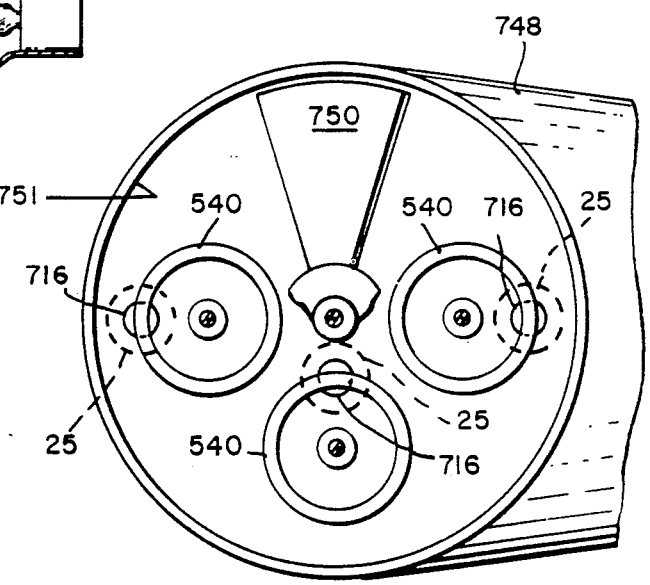
Fig. 25.

HIGH-INTENSITY LIGHT SOURCE FOR A FIBER OPTICS ILLUMINATION SYSTEM

This application is a continuation-in-part of United States patent application Ser. No. 06/716,575, filed Mar. 27, 1985, now abandoned.

BACKGROUND OF THE INVENTION

1. Field of the Invention

This invention relates to a high-intensity light source for a fiber optics illumination system for applying light from a high-intensity light source along a predetermined path for illuminating one end of a fiber optics illumination conduit or light conduit. More specifically, the present invention relates to a high-intensity light source for a fiber optics illumination system wherein an axial flow, propeller-type impeller, that is, a fan, is positioned to have its vanes rotated through the gap between the lamp and the light conduit and the light is directed along the predetermined path onto one end of a fiber optics illumination conduit.

2. Description of the Prior Art

High-intensity light sources for fiber optics illumination systems are well known in the art. Typical of the fiber optics sources known in the art are those described in U.S. Pat. Nos. 3,775,606 and 3,733,481. The fiber optics light console disclosed in U.S. Pat. No. 3,775,606 relates to a light source which includes a dual illumination system which permits simultaneous use of two cables with the same console and which enables the user to switch from one cable to another cable in the event of failure of one light source during a surgical operation. The light console employs light and heat shielding means surrounding each of the light sources, and the shielding means function as a heat sink. Preferably, the shielding means may be air cooled to protect the front portion of the console to reduce the temperature thereof. The light console is air cooled by a fan-type motor with the motor located rearward of the light source and the bayonet-type mounting apertures which are adapted to receive ends of fiber optics light cables.

U.S. Pat. No. 3,733,481 discloses a fiber optics light source which includes a lamp house including a lamp, reflector and condenser aligned for focusing light into the receiving end of a fiber optics bundle and which utilizes an air impeller mounted laterally of the lamp house to direct air over the lamp for dissipating heat build-up.

It is also known in the art to position one end of a fiber optics bundle a predetermined distance from a light source forming a gap therebetween to permit the light from the light source to be received by the one end of the fiber optics bundle and transmitted therethrough to illuminate the fiber optics bundle. Typical of such light sources are those described in U.S. Pat. Nos. 4,128,332 and 3,497,981.

It is also known in the art to position a filter, or the like, between a high-intensity light source and the one end of a fiber optics bundle in order to control the wavelength of light applied to one end of the fiber optics bundle. One such device is disclosed in U.S. Pat. No. 4,236,191 wherein a fiber optics bundle is positioned at a predetermined space from a light source, and a color wheel having a plurality of transparent colored areas formed of glass and suitable plastic mounted for rotation proximate the light bulb and intermediate the light source and the end of the fiber optics bundle. The light transmitted by the fiber optics bundle is utilized to illuminate a musical instrument such as a guitar.

U.S. Pat. No. 3,536,908 discloses a fiber optics lighting system which utilizes a rotatable turntable member which is divided into light-transmitting radial segments, and the segments are rotated intermediate the gap between the end of a light source and the end of a fiber optics bundle. The rate of rotation of the rotatable member interposed between the light source and the ends of fiber optics bundles, which are disclosed in U.S. Pat. Nos. 4,236,191 and 3,536,908, is at a very low speed and is intended to present different colors which are visually observable to a viewer.

In addition to the method described above, hot mirrors, which absorb infrared and thus become hot, while reflecting visible light, have been used to reduce heat and temperature at the light-receiving end of the light conduit, but hot mirrors do not absorb enough of the infrared radiation to prevent damage to the light conduit, and hot mirrors are expensive. Cold mirrors, which reflect visible light while allowing infrared radiation to pass through, still reflect too much infrared radiation, causing damage to the light conduit.

The high-intensity light source for a fiber optics illumination system has a large number of advantages over the known prior art light sources. None of the known prior art systems disclose, suggest, or teach the use of an impeller or fan located in the gap between a light source and one end of the fiber optics bundle. The impeller displaces air heated by the light source located in the vicinity of the reflector, light source, and one end of the fiber optics bundle along a generally axial path towards the end of the fiber optics bundle and away from the light source. The air flow produces a negative pressure in the vicinity of the impeller, reflector, and light source which causes cooling of the end of the fiber optics.

None of the fiber optics light sources disclosed in U.S. Pat. Nos. 3,775,606 and 3,733,481 disclose a cooling fan having its blades disposed between the light source and the fiber optic.

The use of a rotatable color wheel is disclosed in U.S. Pat. Nos. 4,236,191 and 3,536,908 wherein a color wheel is positioned in the gap between the light source and the end of the fiber optic to filter the light, and thereby change the color of the light.

Two fundamentally different type of fiber optics, or light conduits, are employed in the art. First, and probably most widely recognized, is a fiber optic formed from carefully extruded glass filaments, or fibers, which are very fine. A plurality of such fibers are bound together into a bundle, which is glued together with an adhesive such as epoxy. Fiber optics of this type are commonly used for transmitting communications, as well as for simple transmission of light for lighting purposes. Glass fiber optics are not well suited for general illumination systems disclosed in the prior art. Glass fiber optics are quite fragile and each fiber must be coated with a protective coating, typically a fluorine-based polymer, to protect the glass fiber. The bundle of a plurality of fiber optics must then be encased in a larger sheath. As noted, the individual fibers are then glued together with an adhesive, customarily epoxy. In high intensity illumination systems according to the prior art, the bundle of fiber optics becomes too hot for the epoxy, which breaks down chemically. The epoxy then loses its adhesive properties, causing the bundle of fiber optics to lose its cohesiveness, and the individual fibers tend to separate from one another, reducing the efficiency of light transfer to the fiber optic bundle. Furthermore, a chemical product of reaction of the decomposition of many types of epoxies used in glass fiber optics is a fluorine-based acid, which eats into the glass fibers and ruins them. In addition, as the epoxy deteriorates and decomposes, it undergoes a color change from substantially transparent to amber, to yellow, to brown. This color shift causes the fiber optic bundle to absorb more infrared radiation, which is converted to additional heat, accelerating the deterioration and decomposition of the epoxy exponentially. Generally used epoxies decompose when subjected to temperatures of about 700 degrees F. or more. A few specialty epoxies, which are quite expensive, may tolerate temperatures of about 1,200 degrees F. before decomposing. The quantity of heat that the epoxy is exposed to it also a critical factor in the chemical breakdown of the epoxy. Prior art illumination systems that attempt to employ high intensity light sources cannot keep the temperature and heat low enough to prevent decomposition of the epoxy.

The second type of optic fiber is a polymerized plastic type substance, which may be any of a number of chemical compositions that are well known in the art. Such compounds are customarily formed in situ in some type of vessel, such as a length of tubing. The resulting product is a semi-solid plastic type material, which may be roughly transparent or translucent. It may be more or less flexible. It is customarily available in sizes ranging from about 3/16 inch to about ⅝ inch in diameter and in various lengths. The material is not, however, a fiber in any normal sense of the word. It is rather a semi-solid continuously linked polymer. Most such plastic light conduits melt at temperatures of about 180 degrees F. At temperatures well below the melting point, such plastic light conduits oxidize and chemically deteriorate, with readily apparent color shift from translucent to amber, to yellow, to brown. Naturally, this color shift caused by the chemical deterioration reduces the amount of light that the light conduit will conduct and reduces the color temperature and changes the color of the light transmitted through the light conduit, all of which reduce the utility of the illumination system and increase maintenance costs. Additionally, the now-darker light conduit absorbs more infrared radiation, which is converted to heat, accelerating the deterioration of the light conduit exponentially.

No generic name for such plastic based polymer light conduits is known to applicant. In this patient application, the term "light conduit" shall be a generic term that refers to any type of material designed to transmit, or conduct light through it, including glass fiber optic bundles, polymerized plastics, or other material that is or may become known.

In the prior art systems, including the patents described hereinabove, the heat from the light source makes the end of the fiber optic extremely hot, which severely reduces the life of the fiber optic. In addition, if the end of the fiber optics bundle is heated to a very high temperature, the epoxy used in the glass fibers may break down, reducing the amount of light entering into the fiber optics bundle.

It is becoming increasingly desirable in the art to use plastic fiber optics bundles in a wide variety of applications. Plastic fiber optics are even more susceptible to heat damage than bundles of glass fibers and, because of this heat damage, the number of applications in which the plastic light conduit can be used is limited primarily to applications requiring small amounts of light. Plastic or polymerized fiber optics, or light conduits, deteriorate quickly when exposed to heat and oxygen. They become quite brittle and turn brown. The brown color of the light receiving end discolors the light transmitted through the fiber optic in an unpleasing manner, and causes the fiber optic to absorb more heat and to convert more light to heat, both of which accelerate the deterioration of the fiber optic.

Many techniques have been used to reduce the amount of heat at the light receiving end of the fiber optics bundle, including filters, fans, cold mirrors, and the like, as noted above. Such systems have achieved only limited success in keeping the light receiving end of the fiber optic cool, and they reduce the amount of light received by the fiber optic.

Consequently, most fiber optic illumination systems of the prior art must use a lamp or other light source that consumes less than about 150 watts of electricity. Even ordinary household incandescent 100 watt light bulbs produce too much heat for many prior art light conduit illumination systems. A few prior art illumination systems can use light sources that consume up to about 120–130 watts of electricity, but then the light conduit must be placed relatively distant from the light source and cannot be placed near the focal point of any focusing reflector, or lens, without causing the light conduit to deteriorate rapidly from the heat.

It is important to recognize that although the prior art discloses fiber optic illumination systems, these are low intensity illumination systems that cannot transmit very much light, whereas the present invention is directed to an illumination system that can easily employ high intensity light source consuming 500 watts of electricity or more. Even using dramatically more powerful lamps, the present invention also permits placement of the light conduit at the focal point of a focusing reflector or lens.

Demand for lighting systems employing light conduits is rapidly expanding in many applications, including: use in wet places where electricity is not safe, such as in swimming pools; use in places requiring indirect lighting, such as instrument panels; use in places where the heat of incandescent light is not acceptable; use in places that are small and difficult to direct light into; and many others.

It is also known in the art to utilize a fiber optics illumination system for a wide variety of applications, such as: a pendulum light source as disclosed in U.S. Pat. No. 3,389,247; a fiber optics light source described in U.S. Pat. No. 3,382,353; an illumination device for a sign, as disclosed in U.S. Pat. No. 3,208,174; a self-luminous sign, as disclosed in U.S. Pat. No. 3,038,271; and illuminated signs, as disclosed in U.S. Pat. Nos. 2,173,371 and 2,058,900.

Therefore a need exists for a *high intensity* light source for a light conduit illumination system that will provide brighter lighting from a light conduit or conduits, while preventing deterioration of the light conduit resulting from excess exposure to heat and oxygen.

SUMMARY OF THE INVENTION

This invention relates to a new, novel and improved high intensity light source for a fiber optics illumination system. In the preferred embodiment, the high-intensity light source includes a high intensity incandescent halogen lamp, although any suitable light source may be used, and a reflector for directing light from the high-intensity light source along a predetermined path. The fiber optics illumination system includes means adapted to position one end of a fiber optics illumination conduit along the predetermined path at a spaced distance from the high-intensity light source, defining a gap therebetween. An axial flow, propeller-type impeller having a plurality of vanes extending radially therefrom at a selected pitch, that is, a fan is located along the predetermined path. The fan is positioned relative to the gap such that when the fan is rotated, the blades are transported through the gap and the light is directed along the predetermined path. The fan is capable of being rotated at a rate of rotation at least equal to a predetermined rate so that the interception of the light by the fan blades is visible imperceptible to a user, while the fan simultaneously displaces air heated by the light source located in the vicinity of the reflector, light source, and positioning means, along a generally axial path towards the positioning means and away from the light source to form a negative pressure in the vicinity of the fan, the reflector, and the light source. This negative pressure causes ambient air located in other than the vicinity of the reflector, light source, and impeller to be drawn into the negative pressure area, whereupon the air is heated and then displaced and exhausted from the apparatus by the rotating cooling fan. The fiber optics illumination system naturally includes an electric motor coupled to the fan to rotate it at a predetermined rate. The fan may advantageously be made of a transparent material, such as a transparent plastic. The color of the fan does not have much effect on the illumination from the light conduit—even a black fan will not noticeably reduce the light in the light conduit. A transparent fan will, however, absorb less infrared radiation, will therefore stay cooler, and will have a longer life.

The high-intensity light source for a fiber optics illumination system of the present invention overcomes many of the disadvantages of the prior art devices.

Accordingly it is an object of the present invention to provide a high intensity light source for a light conduit illumination system that prevents deterioration of the light conduit from excess heat.

It is a further object of the present invention to provide a high intensity light source for a light conduit illumination system that prevents deterioration of the light conduit from continued exposure to oxygen.

It is a further object of the present invention to provide a lighting system that is safe to use in environments where electricity is not safe, such as wet environments.

It is a further object of the present invention to provide a lighting system that can be used to replace neon lights.

It is a still further object of the present invention to provide a high intensity light source for a light conduit illumination system that efficiently transmits light to the end of the light conduit, increasing the amount of light available through the light conduit, relative to the amount of light produced by the light source, thereby reducing the power requirements for the actual light source.

One advantage of the present invention is that the cooling fan can be placed directly in the path of the light source and located relative to the light source and end of the fiber optics bundle so that the blades of the cooling fan rotate very close to the end of the light conduit, thereby significantly reducing the heat applied to the end of the light conduit and creating air turbulence that significantly reduces the ambient temperature at the end of the light conduit bundle.

Another advantage of the present invention is that the impeller can be in the form of an axial flow, propeller-type impeller which is positioned to be rotated such that the plurality of vanes thereof intercept the light as it passes from the light source to the end of the fiber optics bundle and wherein the impeller is rotated at a rate of approximately 500 RPM or higher, such that a flickering effect, which is normally visible to the user, is not visually perceived by the user.

A further advantage of the present invention is that the fiber optics bundle end can be placed directly in front of the lamp at a preselected gap which represents the most efficient point of coupling which occurs at the lamp focal point, such that the maximum efficiency of transfer of light from the light source to the end of the fiber optics bundle can be obtained. Very little reduction occurs in the efficiency of light transferred from a high-intensity light source to the end of a light conduit when the cooling fan is located therebetween if the cooling fan is rotated at a rate of about 500 revolutions per minute (RPM) or more, and the rotating fan does not cause any perceptible flicker or decrease in the amount of light transmitted through the light conduit. Use of a fan having transparent blades further increases the amount of light received by the end of the light conduit.

Another advantage of the present invention is that the temperature and the amount of heat incident to the end of the fiber optics bundle can be so substantially reduced and be held at such a low ambient temperature that low-temperature plastics can be utilized at the end thereof and a low-temperature plastic color wheel can be placed at the lamp focal point with color gels that would melt at the temperatures which are found at the end of a light conduit exposed to a high-intensity light source of the prior art.

A still further advantage of the present invention is that the low temperature permits inexpensive materials to be used in a wide range of products and applications which heretofore could not be fabricated and sold because of the high temperature problems associated with the prior art fiber optics light sources.

A still further advantage of the present invention is that more powerful light sources can be used in the high-intensity light source, and the amount of light which is applied to and transmitted by the fiber optics bundle can be increased, which is highly desirable in many applications.

Another advantage of the present invention is that very bright light sources, for example, quartz halogen lamps, can be utilized in fiber optics applications. The lamps can be placed in a position where the lamp is located in an opposed spaced relationship to the end of the fiber optics bundle. This eliminates the necessity of positioning such high-intensity sources in directions where air cooling of the lamps can be obtained only by positioning the lamps relative to the remotely disposed impellers. This avoids the limitations imposed on high-intensity light sources wherein the high-intensity light source must be positioned relative to the source of air cooling rather than to the end of the fiber optics bundle, which is preferred.

Another advantage of the present invention is that even quartz halogen lamps, which develop very high temperatures, can be used with the base side in any orientation, included up, which normally traps too much heat in the reflector, burning out the lamp prematurely.

A still further advantage of the present invention is that the use of a high-intensity light source for a fiber optics illumination system, together with a plastic fiber optics bundle, or other light conduit, can be utilized for a wide range of applications, such as light systems for underwater environments like swimming pools, spas, and the like.

A further advantage of the present invention is that the distant end of a fiber optics bundle, or other light conduit, (remote from the light-receiving end of the light conduit) can be coupled to a fluid-tight coupling member to provide a sealed unit between a fluid environment and the light conduit, thereby providing a water-proof lighting system that does not place any electrical equipment near the water, an obvious safety feature.

Another advantage of the present invention is that low-temperature colored gels can be inserted into the fiber optics bundle at a location of between about 6 inches to about 12 inches from the end adjacent the high-intensity light source to permanently color the light conducted by the light conduit, but the heat and infrared energy of the lamp has been sufficiently dissipated at the location of the gel or other light filter that heat is not a problem at the location of the gel or other light filter.

Another advantage of the present invention is that the high-intensity light source, a fiber optics bundle, and an illumination means can be used to build display and advertising devices, such as signs, or the like.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not for limitation, there is illustrated:

FIG. 20 is a section taken along lines 20—20 of FIG. 17.

FIG. 21 is an elevation, partially in section, of a glass envelope for retaining and protecting a light conduit in a high intensity light source according to the present invention.

FIG. 22 is an elevation, partially in section, of another embodiment of the a glass envelop and stopper according to the present invention.

FIG. 23 is a schematic illustration showing the relationship between the cooling fan, the lamp, the color wheel, and the light-receiving end of a light conduit relative to the focal point of the lamp and reflector, according to the present invention.

FIG. 24 is a perspective view of a mechanical light attenuation member for controlling the amount of light received by the light-receiving end of the light conduit according to the present invention.

FIG. 25 is a schematic top plan view of a high intensity light source for a light conduit illumination system having three separate illumination systems according to the present invention housed in one apparatus.

DETAILED DESCRIPTION OF THE PREFERRED EMBODIMENT

Figure 1:
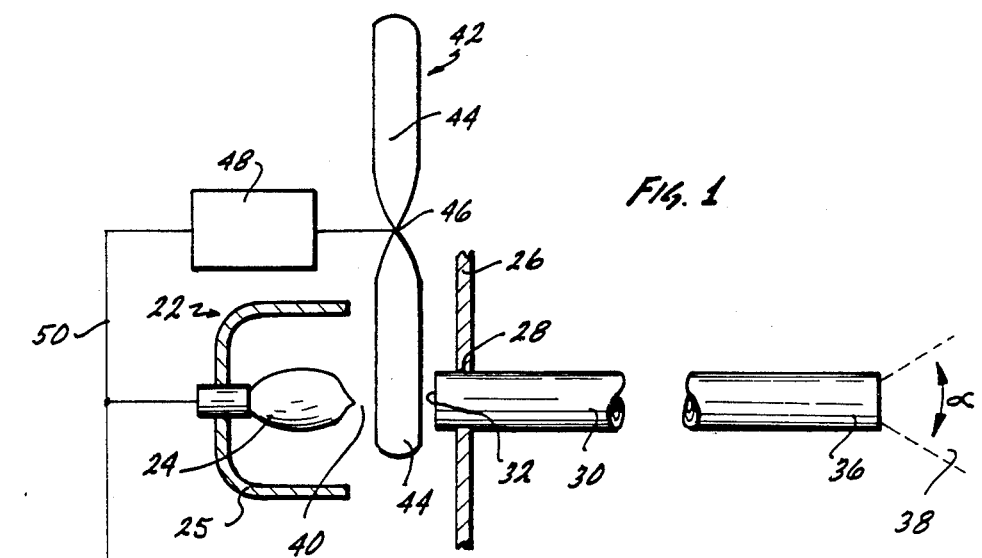
FIG. 1 is a schematic representation, partially in section, of a high-intensity light source for a light conduit illumination system according to the present invention.

FIG. 1 illustrates a high-intensity illumination means adapted for use in a fiber optics illumination system which includes light conduit 30 having one end 32 thereof which is adapted to receive light from high intensity light source 24. Light conduit 30 has its remote end 36 formed such that light will be transmitted through end 38 at an angle alpha.

The illumination means includes a high-intensity lamp 24, which is a quartz halogen lamp designed to operate on twenty-four volts in a preferred embodiment, and reflector 25 for directing light from the high-intensity light source along a predetermined path from lamp 24 to the one end 32 of the fiber optics bundle 30. Gap 40 is located between lamp 24 and end 32 of light conduit 30. Preferably, the end 32 of light conduit 30 is positioned at the focal point of lamp 24 in order to provide the maximum coupling efficiency between the light generated by the light source 24 and the end 32 of the fiber optics bundle 30. Reflector 25 is specially designed to focus the light into a light-spot (rather than the theoretically perfect "focal points") of about five eights of an inch in diameter, at a distance of about one and one-half inches in front of the leading edge of reflector 25, as is well known in the art. Reflectors having different diameter light spots and different focal lengths may be selected and matched to a particular lighting system, which is well within the skill of the ordinary mechanic in the art. Ideally, of course, the diameter of the light spot produced by the reflector would be the same as the diameter of the light conduit being used. Even so, much of the light produced by the lamp will be scattered an will not strike the light-receiving end of the light conduit.

An illumination system according to the present invention may readily be adapted to use any light-focusing system, such as convex lenses, or a condenser lens in cooperation with focusing lens or lenses. It has been found, however, that such lenses are not necessary and that use of a properly designed reflector is the most efficacious method of focusing the light. This is true because a minimum of approximately eight percent of incident light is reflected at the interface between two media, such as glass and air, even when the angle of incidence is ninety degrees. Thus, even a simple single element lens transmits only about eighty-four percent of the light striking it at ninety degrees. Clearly, lens focusing systems, especially those employing more than one glass element, substantially reduce the light available to the light conduit.

Throughout this patent application, one end of the light conduit is referred to as the "light-receiving end" and the other end is referred to as the "light-transmitting end" when it is necessary to distinguish between the two ends. There is no structured difference between the two ends, and either may perform either the function of light-receiving or the function of light-transmitting with equal effectiveness, but one end must be adjacent the lamp, and the other end remote therefrom.

Lamp 24 is generally positioned relative to a housing illustrated by wall 26 having an aperture 28 located therein which is adapted to position one end 32 of the fiber optics illumination conduit 30 along the predetermined path at a spaced distance from the high-intensity light source 24 defining a gap 40 therebetween.

An impeller 42 having a plurality of radially extending vanes 44 is located along the predetermined path. In the preferred embodiment, the impeller 42 is an axial flow, propeller-type impeller having a plurality of vanes 44 extending radially therefrom and at a selected pitch. The impeller 42 is positioned relative to the gap 40 such that when the impeller 42 is rotated the radially extending vanes 44 are transported through the gap 40 and intercept the light being directed along the predetermined path. The impeller 42 is capable of being rotated at a rate of rotation at least equal to a predetermined rate. The predetermined rate is that rate wherein the interception of the light by the plurality of vanes 44 is visibly imperceptible to a user but wherein the rotating impeller 42 is able to displace air heated by the light source 24 located in the vicinity of the reflector 25 and light source 24 towards aperture 28, which path is a generally axial path relative to the impeller 44. The heated air is directed away from the light source 24 to form a negative pressure in the vicinity of the impeller 44. This is explained in greater detail in FIG. 2. The ambient air located in the vicinity of other than the reflector 25, light source 24, and impeller 44 is drawn into the negative pressure area, heated by the light source 24, and then displaced in response to rotation of the impeller 44.

In FIG. 1, the impeller 42 is rotated by a rotating means, such as motor 48, at a rate of rotation which is at least equal to the predetermined rate. The motor 48 and the light source 24 are operatively coupled via lead 50 to a power source 52.

Figure 2:
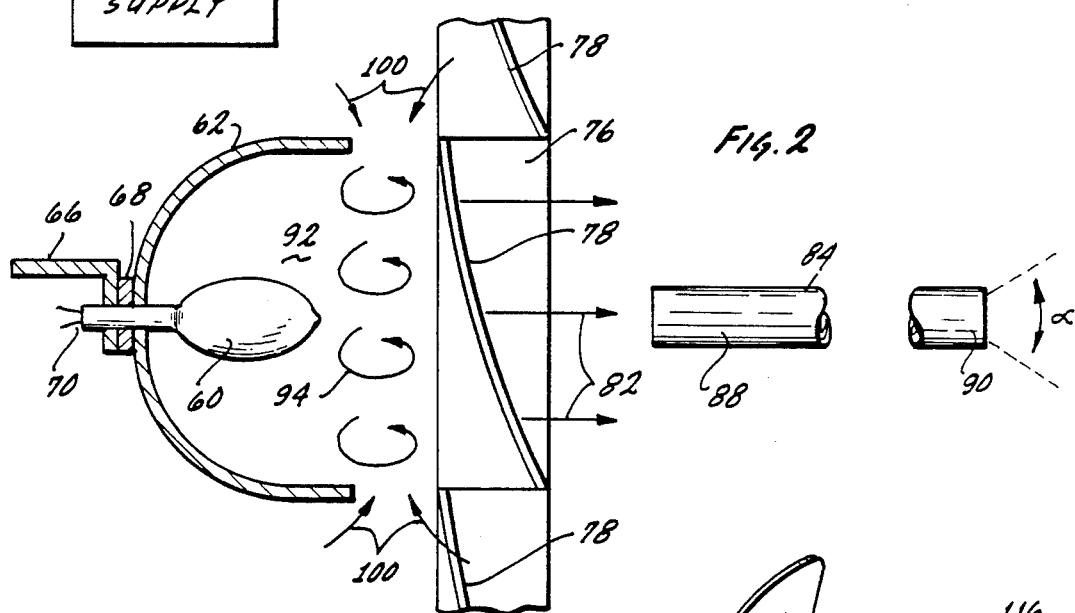
FIG. 2 is a schematic representation, partially in section, of a high-intensity light source mounted on an insulated bracket and illustrating the negative pressure area between the cooling fan and the light source.

FIG. 2 is an alternate embodiment of a side view wherein the impeller is rotated such that the blades thereof intercept the light passing from the light source to the fiber optics bundle. In the embodiment of FIG. 2, a high-intensity light source is operatively coupled to light source bracket 66 by a Teflon insulator 68. The Teflon insulator is preferably formed of FEP Teflon, which is well known in the art. The reflector 62 reflects the light generated from the high-intensity light source 60 when energized by electrical power applied to terminal 70 thereof. The light then heats the air located in the vicinity of the reflector illustrated by 92, which is then displaced by rotation of the impeller having a hub 76, radially extending vanes 78, which are curved so as to displace the air from the vicinity of the reflector 62 towards the end 88 of fiber optics conduit 84. The air flows axially, as illustrated by arrows 82. By rotating the impeller at a speed of approximately 500 RPM or higher, the curved vanes 78 displace the air along the lines as shown by arrows 82.

Concurrently, the impeller is rotated such that hub 76 having a plurality of radially extending vanes 78 therefrom displaces the heated air in the vicinity of the area 92 along the axial paths shown by arrows 82, resulting in a negative pressure in the vicinity of the impeller, light source 60, and reflector 62, which negative pressure is illustrated by arrows 94. The negative pressure 94 draws ambient air from the vicinity other than the location 92 having the heated air into the negative back pressure, the ambient air flow being shown by arrows 100. The process is continually repeated, which results in the high-intensity lamp 60 operating at or near its desired operating temperature and with the impeller rotating the plurality of vanes 78 at a sufficient rate of rotation to displace the air at a high enough rate such that when the air is received by the end 88 of fiber optics conduit 84, the temperature of the air is low, thereby avoiding destruction of the end 88 of the fiber optics 84. The vanes 78 intercept the light from the light source 60 which traverses along the predetermined path along one end 88 of the fiber optics 84. The light received by the one end 88 and transssmitted by the fiber optics bundle or illumination conduit 84 emanates out of end 90 as illustrated in FIG. 2.

Figure 3:
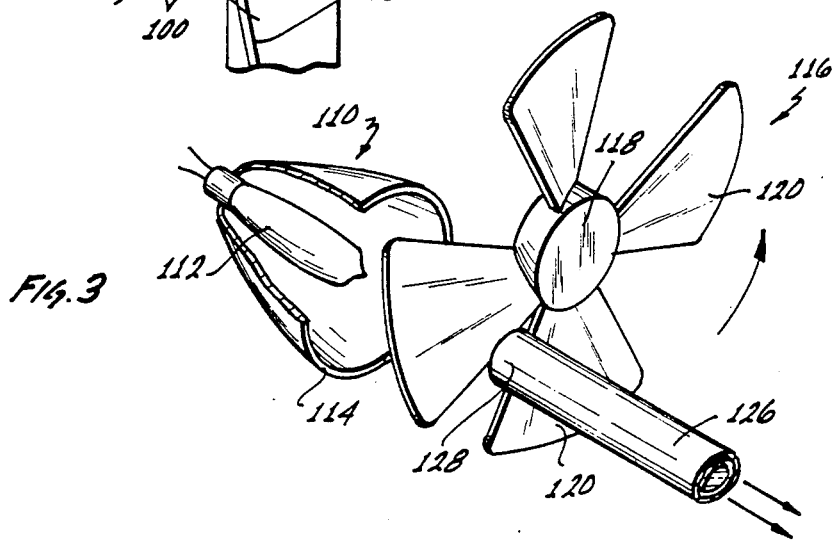
FIG. 3 is a perspective view, partially in section, showing the relationship between the lamp, the cooling fan, and the light-receiving end of the light conduit.

FIG. 3 illustrates the preferred embodiment of the high-intensity light source, which includes a high-intensity light source 112, which may be a halogen lamp, and a parabolic-shaped reflector 110 which defines a discrete edge 114. There is a slight distance between the end of reflector edge 114 and the impeller 116. The impeller 116 includes a hub 118 and a plurality of radially extending blades 120 which have a predetermined pitch. The pitch illustrated in FIG. 3 is such that the blades displace the air from the vicinity of the reflector 110 and axially towards the one end 128 of fiber optics bundle 126.

Figure 4:
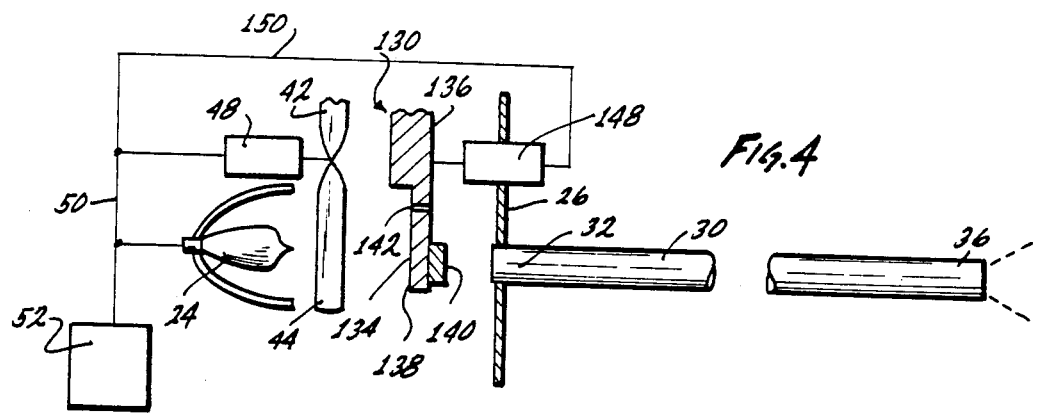
FIG. 4 is a schematic representation, partially in section, illustrating a high-intensity light source for a light conduit illumination system according to the present invention and having a rotatable color wheel located between the cooling fan and the light-receiving end of the light conduit.

FIG. 4 illustrates a variation of the high-intensity light source illustrated in FIG. 1 with the addition of a light-attenuating member, such as a rotatable disc 130 having color gels located in the end thereof. The light-attenuating member is positioned along the predetermined path intermediate the impeller 42 such that the plurality of rotating vanes 44 will rotate without hitting the light-attenuating member. The light traversing along the predetermined path is attenuated by the filter member such that the wavelength of the lights ultimately applied to the one end 32 of the fiber optics bundle 30 can be selected. In the embodiment illustrated in FIG. 4, the rotatable member 130 includes a hub 136 which has an annular-shaped outer rim 134 formed thereon. The extending outer rim includes a plurality of air-bleeding holes 142 and a plurality of apertured areas 138 which are adapted to receive color gels 140. A motor 148 is positioned to rotate the rotatable member 130 in such a manner that the outer edge thereof including the color gels 140 are selectively passed through the light path and intermediate the light source 24 and the one end 32 of the fiber optics bundle 30.

Figure 5:
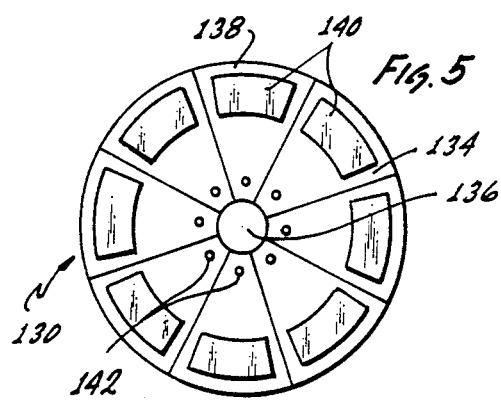
FIG. 5 is a plan view of a color wheel according to the present invention.

FIG. 5 shows the rotatable disc member 130 in a front view illustrating the relative positions between the hub 136, the extending outer rim 134, the apertures 138, and the locations of the gels 140. In the embodiment illustrated in FIG. 5, the gels are formed into an arcuate shape so as to ensure that the color gel is positioned between the light source 24 and the end 32 of a fiber optics bundle 30 for a controlled sector angle of the disc rotation. The disc 130 is rotated at a relatively low rate of rotation, such as about 2 RPM.

Figure 9:
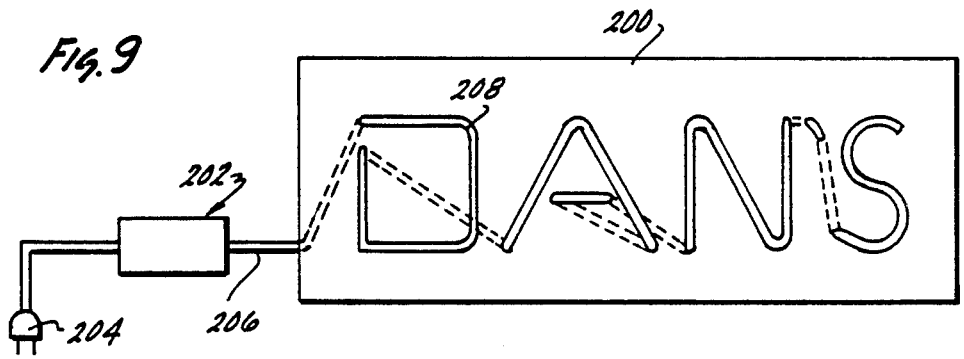
FIG. 9 is a diagrammatic representation of a display sign formed by a light conduit that leaks light out of its sidewalls.

When a light conduit is used for signs or other light displays, such as the sign illustrated in FIG. 9, it is necessary that light radiate from the sidewalls of the light conduit. Some amount of light leaks from the sidewalls of all light conduits. In the case of signs, however, clearly the sign will be brighter, easier to see, and consequently more desirable if most or all the light directed into the light conduit leaks out the sidewalls. Glass fiber optics do not leak enough light from their sidewalls to be useful for signs or other lighted displays that rely on sidewall lighting. Plastic-type polymer based light conduits do leak enough light from their sidewalls to be useful for such signs and lighted displays.

Figure 6:
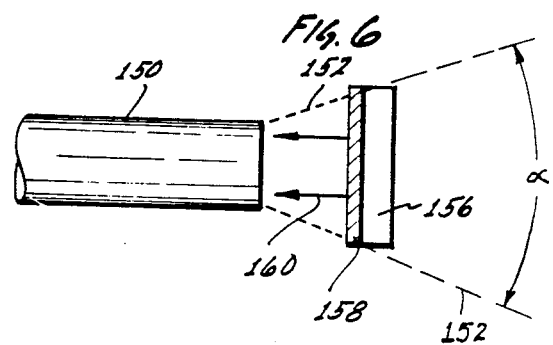
FIG. 6 is a plan view, partially in section, of the other end of a light conduit utilizing a reflective mirror to reflect the light from one end thereof back into the light conduit.

The amount of light to be retained within the fiber optics light conduit can be controlled in a number of ways, one of which is illustrated in FIG. 6. In FIG. 6, light-transmitting end 150 of a fiber optics bundle transmits light therefrom along an angle alpha, as illustrated by lines 152. A reflective member having a base 156 and a mirror reflective surface 158 is spaced from light-transmitting end 150 at a predetermined distance to reflect the light received from the end thereof back into the light conduit, simulating a light source, with the reflected light being shown by arrows 160. By placing the mirror on light-transmitting end 150 of the light conduit, the end of a sign remote from the light source is about 10%–15% brighter than it otherwise would be, increasing the uniformity, and hence esthetic appeal of a display or sign using illuminated plastic-type light conduits. Coating otherwise light-transmitting end 150 of the light conduit with a white substance, such as paint, increases the amount of light reflected back into the light conduit even more. A colored coating on the otherwise light-receiving end 150 of the light conduit reflects its color back into the light conduit, creating a colored display. The color applied to the otherwise light-transmitting end of the light conduit may be the same as the color of a filter at the light-transmitting end, to create a nearly uniform color throughout the display, or it may be a different color.

Alternatively, a high intensity illumination system according to the present invention may be applied to each end of the light conduit, with or without a color wheel at either or both ends of the light conduit. Rotation of the color wheels may be synchronized so that the color changes from each end of the light conduit are the same through time.

Figure 7:
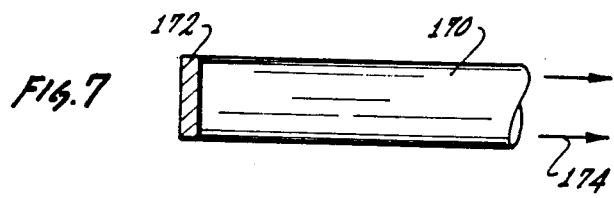
FIG. 7 is a diagrammatic representation of one end of a light conduit having a color gel, or other light filter, located at the end thereof to determine the wavelength, and hence the color, of the light transmitted by the light conduit.
Figure 8:
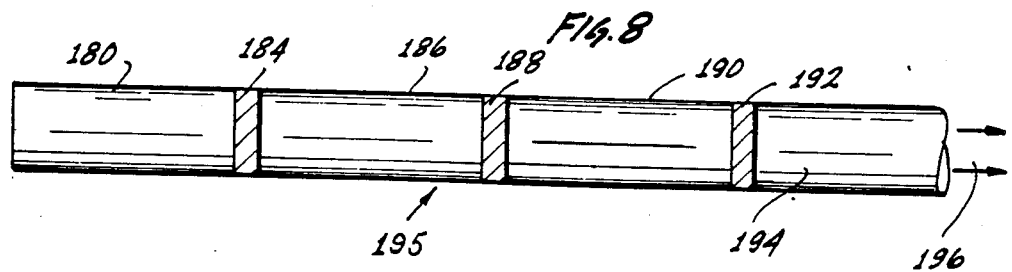
FIG. 8 is a pictorial representation of a light conduit having a plurality of colored gels, or other light filters interposed between sections of the light conduit to change the color of the light in the different sections of the light conduit.

FIGS. 7 and 8 shown alternate methods of controlling the wavelength of the light transmitted by the fiber optics cable. FIG. 7 illustrates a fiber optics cable 170 having a color gel 172, or other light filter, applied to the end thereof. The end with the color gel 172 can be utilized in the embodiment of FIGS. 1 and 3 to control the wavelength of the light being applied thereto. The low temperature located in the vicinity of the fiber optics end is such that the gel 172 will not melt.

FIG. 8 illustrates the use of a fiber optics cable, or other light conduit, having a plurality of segments, with adjacent segments being separated by a colored gel or other light filter. Segment 180 is separated from segment 186 by a filter or gel material 184. Segment 186 is separated from segment 190 by second color gel 188. Likewise, segment 190 is separated from segment 194 by color gel 192. By selecting the wavelengths of light to be passed through the different gels, the wavelengths of light in each of the sections and the color of the light emanating therefrom can be controlled. Naturally, the color effect is cumulative as the light traverses light conduit 195, because once the light passes through one filter, the light is no longer white, but takes on the color of the filter, so the next filter will not produce the same color it would produce if white light had passed through it. That is, if the first filter or color gel 184 is green, segment 186 will glow with green light. Then if color gel 188 is yellow, segment 190 will glow blue, and so forth according to principles of light color that are well known in the art. Naturally, if light is is transmitted through light conduit 195 in the opposite direction, and the same filters or color gels are in place, an entirely different set of colors will be generated, also according to well known principles of light color. (The passage of light through the fiber optics 195 is illustrated by arrows 196.) Methods of splicing plastic-type light conduit and of attaching color filters to it are well known in the art.

Figure 10:
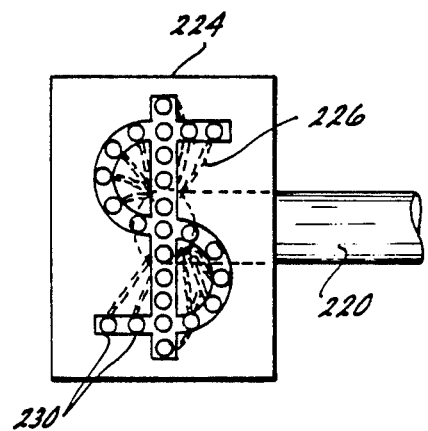
FIG. 10 is a display device utilizing the teachings of the present invention wherein the light-transmitting ends of a plurality of light conduits are formed into a pattern to form a dollar sign.

FIGS. 9 and 10 illustrate a display device utilizing the teachings of the present invention. FIG. 9 illustrates a display sign wherein the sign 200 has a fiber optics conduit 208 formed therein into a predetermined graphic design. One end of the fiber optics 208 illustrated by end 206, is operatively coupled to a high-intensity light source 202. The high-intensity light source 202 has power applied thereto through a power source 204. As illustrated in FIG. 9, the fiber optics conduit 208 is formed into a predetermined path to form letters. The light emanating through the segments of the fiber optics bundle illuminates to give the appearance of a neon sign. The color of the light emanating therefrom can be controlled as described in connection with FIGS. 4, 5, 7 and 8 above.

FIG. 10 illustrates an alternate embodiment of a display device wherein the fiber optics cable is located within the display 224 such that bundles of fiber optics, illustrated by bundles 226, are formed into a graphic image such that light emanates through the ends thereof, such as ends 230. The fiber optics 220 would be operatively connected to a high-intensity light source of the present invention in the same manner as discussed in connection with FIG. 9 hereof.

Figure 11:
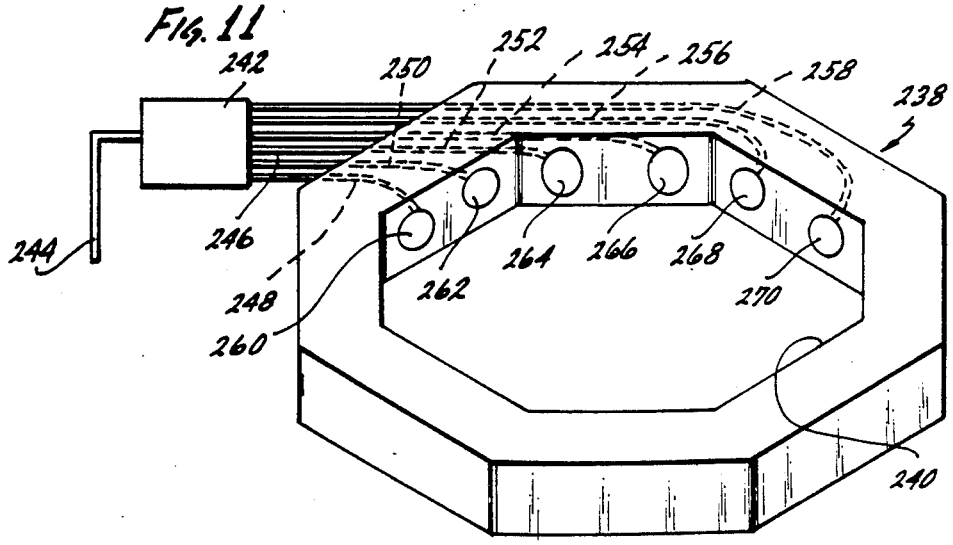
FIG. 11 is a perspective view of a swimming pool lighted according to the present invention.

FIG. 11 illustrates an alternate application utilizing the teachings of the present invention. FIG. 11 shows a spa 238 having an inner wall 240 which holds fluid therein, such as water. A high-intensity light source 242 which is energized from a power source 244 produces a high-intensity light which is applied to one end of the fiber optics bundle 246. The fiber optics bundle has its other end thereof divided into a plurality of smaller fiber optics bundles, illustrated by fiber optics bundles 248, 250, 252, 254, 256 and 258, which terminate in planar light-transmitting members 260, 262, 266, 268 and 270, respectively. The specific construction of the fluid-tight coupling member is illustrated in greater detail in connection with the discussion of FIG. 12.

In ue, the fluid-tight coupling member is adapted to receive the other end of a fiber optics cable such that the light which emanates from the end of the cable is transmitted through the planar members 260, 262, 264, 266, 268, 270 to illuminate the interior of the spa 238. This provides a pleasing illumination effect. Also, by use of the light-attenuating member described in connection with FIGS. 4, 5, and 7 herein, the color of the light can be controlled to provide a very pleasing effect.

Figure 12:
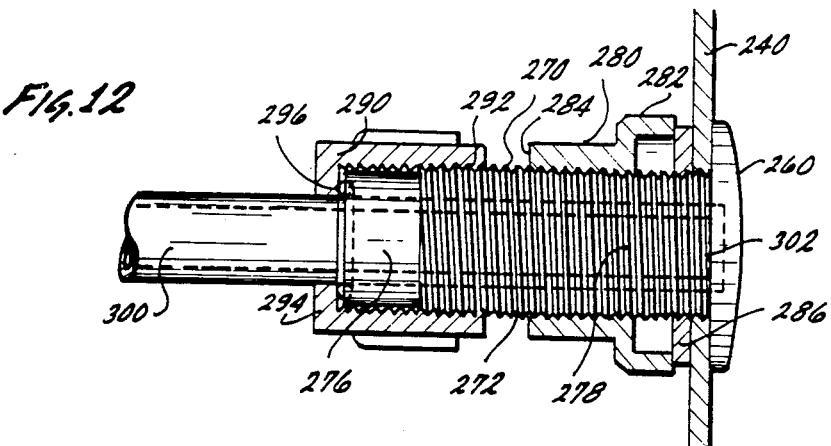
FIG. 12 is a sectional elevation of a fluid-tight coupling member for a light conduit, according to the present invention.

The fluid-tight coupling member for the fiber optics conduit is illustrated in greater detail in FIG. 12. FIG. 12 illustrates a fluid-tight coupling member which comprises an elongated cylindrical-shaped member 270 having a hollowed-out central area 278. The cylindrical-shaped member 270 terminates in a relatively planar member or light-transmitting member 260, which is sealingly attached to the one end of the elongated cylindrical-shaped member 270. The planar member is capable of transmitting light from the interior of the elongated cylindrical-shaped member 270 to the other side thereof. The elongated cylindrical-shaped member 270 has its exterior surface 272 threaded and has its other end thereof terminating in the elongated boss 276. The exterior dimension of the elongated boss 276 is less than the dimension of the threaded portion 272 of the elongated cylindrical-shaped member 270.

A first connector 280 has a central portion and a larger annular-shaped portion 282. The central portion includes means 284 for defining a hollowed-out central area and for providing threading means which are adapted to coact with the threaded members 272 on the external surface of the elongated cylindrical-shaped member 270.

A planar washer member 286 is adapted to be positioned between the annular-shaped outer ring 282 of the first connector 280 which is adapted to be urged into sealing engagement with the surface of a relatively thin wall member 240 and passed through an aperture formed therein. The first connecting member 280 is capable of being rotated in a first direction coacting with the internal threads 284 formed in the interior cavity thereof with the threaded members 272 formed in the exterior surface of the elongated cylindrical-shaped member to form a fluid-tight sealing engagement between the annular-shaped outer ring of the first connecting member 280, the washer 286, the thin wall 240, and the flat, light-transmitting member 260.

A second connecting means 290 includes means for defining an interior cavity thereof 292 which includes means for defining threaded members at one end of the second connecting means and means for defining an end cap 294 at the other thereof, which includes means for defining an aperture having an axis which is coaxially aligned with the center of the hollowed-out central area which is adapted to receive boss 276. The aperture formed in cap 294 is selected to be of a dimension which is adapted to receive and pass a fiber optics conduit 300 having a known geometrical dimension.

An O-shaped ring member 296 having a geometrical dimension which is substantially equal to the geometrical dimension of the fiber optics conduit 300 and which is adapted to be positioned therearound is positioned between the end cap 294 and the edge defining the elongated boss 276 of the elongated cylindrical-shaped member 270. The second connecting member 290, when positioned over the end of the elongated cylindrical-shaped member 270 and when threaded in a predetermined direction thereagainst, causes the end cap 294 to be urged into the O-ring member 296, urging the O-ring member 296 into sealing engagement with the other end of the elongated cylindrical-shaped member 270 forming a fluid-tight seal therebetween. The fiber optics conduit 300 is responsive to a light illumination being applied thereto at one end thereof and to transmit light therethrough to the other end of the fiber optics conduit 302, which is located near the flat, light-transmitting member 260. The light passes out of the end of fiber optics conduit 302, through the flat, light-transmitting member 260, and is then transmitted on the other side of the thin wall 240.

Figure 13A:
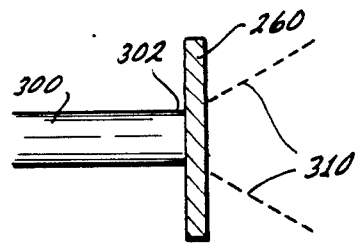
FIGS. 13A, 13B, and 13C illustrate that the angle of the cone of light transmitted through the fluid-tight coupling is determined by the distance between the light-transmitting end of the light conduit and the lens of the fluid-tight coupling.
Figure 13B:
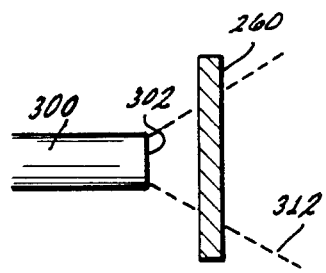
Figure 13C:
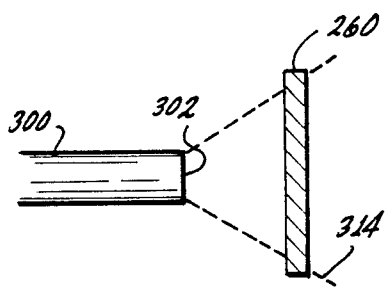

FIGS. 13A, 13B and 13C pictorially illustrate the relationship between the end of fiber optics conduit 300 relative to the flat, planar, light-transmitting surface 260. As illustrated in FIG. 13A, if the end 302 of fiber optics bundle 300 is located very near to or contiguous with planar member 260, the light passes therethrough and forms a light having a diameter illustrated by dashed lines 310. FIG. 13B illustrates that when the end 302 is positioned a short distance from the flat, light-transmitting member 260, which results in an increased angle of light thereby increasing the amount of light passing through the flat, light transmitted therethrough. If the fiber optics 300 is positioned such that end 302 is moved further remotely from the flat, light-transmitting surface 260, a greater degree and angle of light passes through the flat, light-transmitting member, as illustrated by dashed lines 314.

Figure 14:
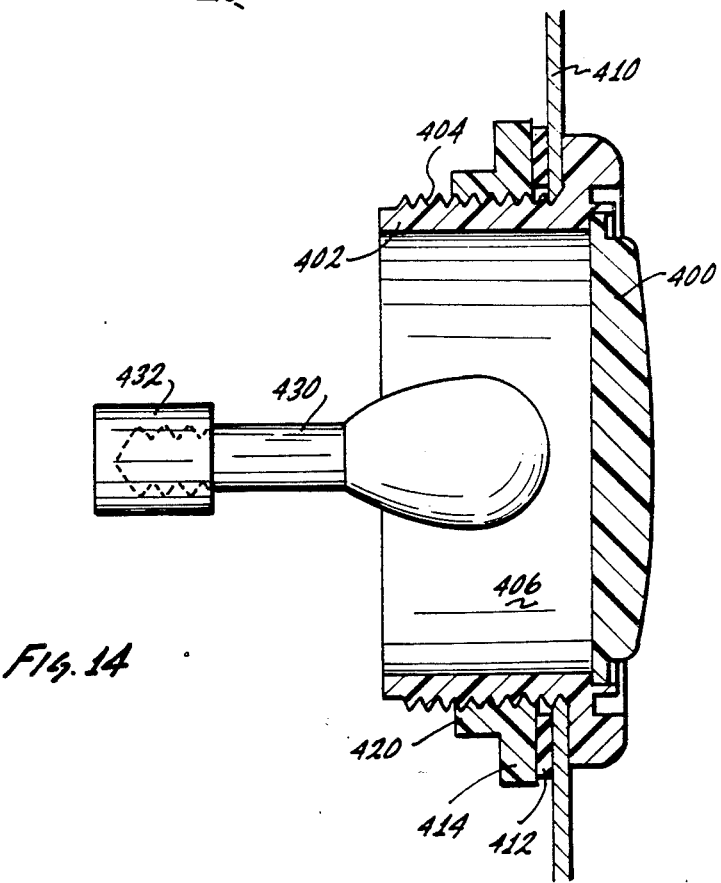
FIG. 14 is a sectional elevation of a fluid-tight coupling member according to the present invention.

FIG. 14 illustrates an alternate embodiment of a fluid-tight coupling member which is adapted to be utilized in a fluid environment. This is a variation of the device of FIG. 12, which has application for use with a standard illumination means or a very wide bundle of fiber optics. The fluid-tight coupling member includes a flat, light-transmitting member 400 which has an elongated central area 402 extending therefrom which defines a hollowed-out central area 406 in the center thereof. A thin wall 410 of a fluid environment, such as the wall of a swimming pool, is formed with an aperture therein which is adapted to pass the elongated central member 402 therethrough, causing the ridge of the flat, light-transmitting member 400 to be brought into sealing engagement with one side of the thin wall 410. The elongated central member has its outer periphery thereof threaded with threaded members 404. The connecting member 414 having an annular-shaped ridge member 420 and having threaded members located in the interior thereof is mounted relative to the elongated central member 402 so as to coact with the threaded members 404 formed around the periphery thereof. When the first connecting member 414 is threaded towards the flat, planar member 400, it is brought into sealing engagement with the annular-shaped ring member or washer 412. By threading the first connecting member 414 in a direction so as to urge the washer 412 against the other side of the wall 410, a fluid-tight seal is formed between the flat, light-transmitting member 400, the thin wall 410, and the washer 412.

In this embodiment, a standard light bulb, illustrated by light bulb 430 and a light socket 432, can be positioned into the hollowed-out area 406. In the event the light bulb 430 needs to be serviced, the light bulb can be withdrawn from the area 406, replaced or serviced, and then reinserted into position. This avoids the necessity of removing a front light-transmitting member 400, which is typical in certain swimming pool or other applications.

Figure 15:
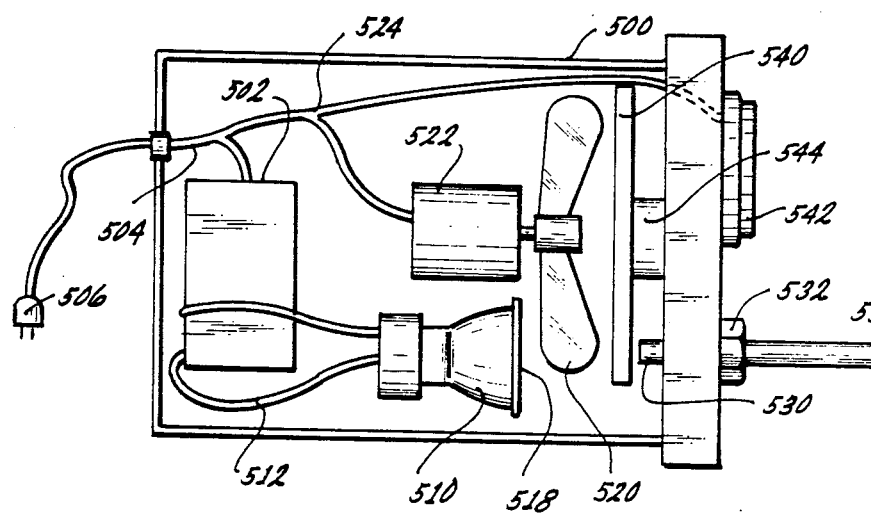
FIG. 15 is a top plan view of a high-intensity light source for a light conduit illumination system according to the present invention adapted for use with a display device.

FIG. 15 illustrates a high-intensity light source having a housing 500 which encloses the entire system. Step-down transformer 502 is energized from a 110-volt, 60-hertz, AC source via lead 504 and plug 506. Step-down transformer 502 applies a low-voltage via leads 512 to a high-intensity light source having a high-intensity lamp 518 and a reflector 510. Light is produced from the high-intensity light source and is applied to one end 530 of a fiber optics bundle 534 which is mounted by a fastening means 532 through the housing 500. Fan, or impeller 520 is adapted to be rotated such that the vanes thereof intercept the light between the light source 518 and the end 530 of the fiber optics conduit 534. Impeller 520 is driven by a motor 522 which is, in turn, connected via lead 524 to the plug 506. In the embodiment of FIG. 15, a rotatable color wheel 540 is mounted such that the segments thereof containing colored gels can be rotated via a drive motor 542 and drift shaft 544 such that the edges thereof are passed through the space between the impeller 520 and the end 530 of the fiber optics conduit 534. In the embodiment of FIG. 15, the wavelength of light being applied to the end 530 can be selectively varied for such applications as the swimming pool application of FIG. 11 or the display applications in FIGS. 9 and 10.

Figure 16:
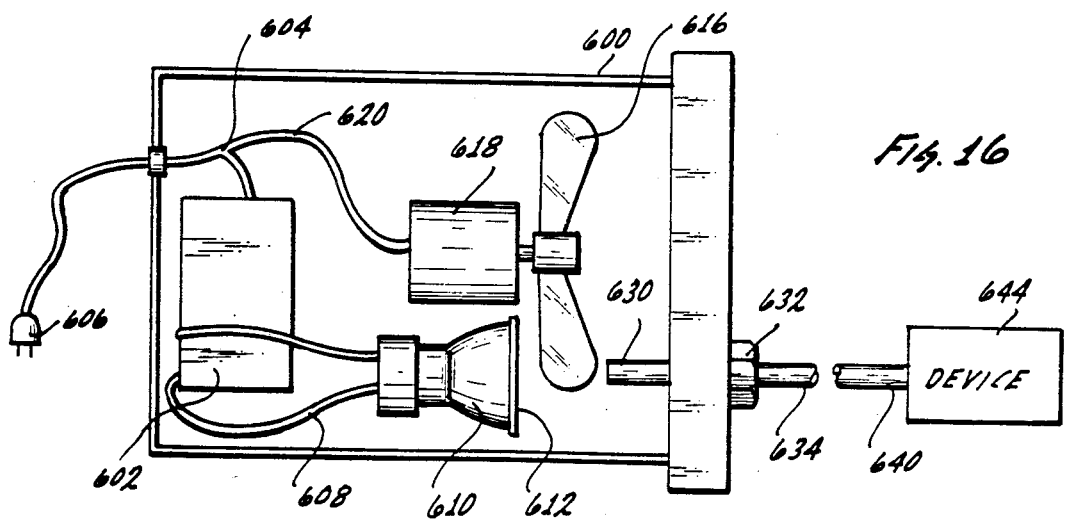
FIG. 16 is a top plan view of a high-intensity light source for a light conduit illumination system adapted for use with other devices, such as medical devices.

FIG. 16 illustrates a high-intensity light source for use in medical equipment or other applications requiring a high-intensity light source for illuminating fiber optics. A housing 600 encloses a step-up transformer 602 which is electrically connected via leads 604 and plug 606 to 120-volt, 60-hertz AC source. Leads 608 apply the step-up voltage to a high-intensity light source 612 located in a parabolic reflector 610. The illumination means directs the light from high-intensity light source 612 along a predetermined path onto the end 630 of a fiber optics conduit 634. A coupling means 632 operatively connects the one end 630 and holds the same in a predetermined position relative to the light source 612. In the preferred embodiment, the end 630 is positioned at the focal point of the high-intensity light source 612, which is developed by the reflector 610. An impeller, in the form of a rotatable fan-type impeller 616 having a plurality of radially extending vanes extending therefrom and having a predetermined pitch is positioned to intercept the light as it passes from the light source 612 onto the end 630 of the fiber optics conduit 634. The turbulence and other effects as described in connection with FIG. 2 provide the means for utilizing very high-temperature and very high-intensity lamps which are required in certain medical applications. The fan-type impeller 616 is driven by a motor 618 which is energized via lead 620 electrically connected to plug 606.

Figure 17:
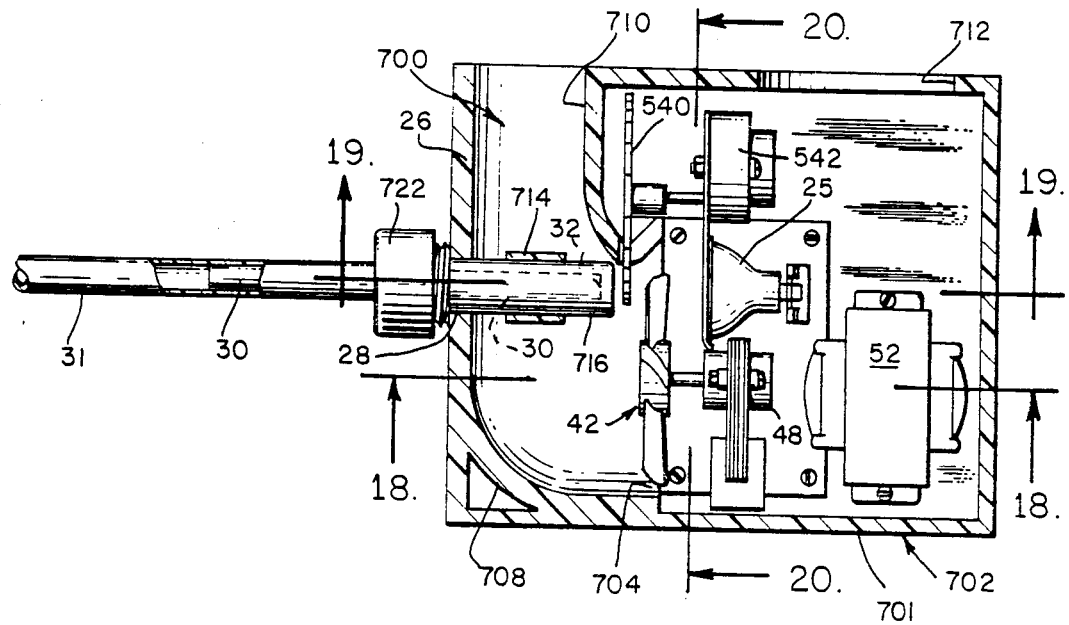
FIG. 17 is a plan view, partially in section, of another embodiment of a high intensity light source for a light conduit illumination system according to the present invention.

FIG. 17 illustrates a preferred embodiment of the illumination system of the present invention including cooling duct 700 for exhausting air from housing 702 of the illumination system. Cooling duct inlet 704 has an inside diameter that matches the outer diameter of fan blade 42, which is located perpendicular to the orientation of cooling duct air inlet 704 of cooling duct 700 and is located at the terminal edge of cooling duct inlet 704. Cooling duct 700 turns approximately ninety degrees at elbow 708, then tapers smoothly to exhaust port 710. Cooling duct 700 constructed in the configuration shown in FIG. 17 conserves space within housing 702. More importantly, cooling duct 700 directs heated cooling air away from light conduit 30, preventing the build-up of heat that might result from having a cooling duct that runs parallel to the light conduit. As illustrated in FIG. 17, air flowing through cooling duct 700 travels almost perpendicular to light conduit 30, as well as striking light-transmitting end 32 directly, providing efficient removal of heat in the vicinity of light conduit 30. It is not necessary that cooling duct 700 have a 90 degree elbow. It is only important that light conduit 30 can penetrate elbow 708 and be retained within cooling duct 700 without being parallel to it. Following the flow of air through cooling duct 700, after the duct passes elbow 708, cooling duct 700 tapers throughout its length until cooling duct 700 terminates the exhaust port 710, in sidewall 26 of housing 702.

Housing air inlet 712, whose diameter is at least equal to the diameter of exhaust port 710, provides a ready path for outside ambient air to flow to fan blade 42, insuring an adequate supply of cooling air for flowing through the interior of housing 702 and through cooling duct 700 at all times. Housing air inlet 712 may be located at any convenient place on a sidewall or the top or bottom of housing 702. In the preferred embodiment illustrated in FIGS. 17 and 26, housing air inlet 712 is located in the same sidewall as exhaust port 710, facilitating bundling and running lengthy ventilation ducts from both openings in housing 702.

The cooling ventilation system described herein protects the light conduit in two ways. First, the cooling system exhausts hot air from the housing, preventing the build-up of heat within the housing. Cooling duct 700 and fan 42 cooperate to insure that the heat developed by lamp 24 is exhausted from housing 702, in contrast to prior art systems in which it air circulation for cooling does not so directly and effectively remove heat from the housing. Second, the cooling system according to the present invention maintains a high level of turbulence on the end of glass envelope 716, and the length of glass envelope 716, which prevents build-up of heat on glass envelope 716. The tapering of cooling duct 700 causes the velocity of the air in duct 700 to increase throughout the length of duct 700, due to operation of the gas laws, which further increases turbulence around glass envelope 716. An illumination system according to the present invention having cooling duct 700 as illustrated in FIG. 17 is the best mode of practicing the present invention now known to the inventor.

Prior art ventilation sytems typically move air in such a manner that a substantially laminar flow of air surrounds the light-receiving end of the light conduit, which allows excessive heat to build-up on the light-receiving end of the light conduit, even if the ventilation system is otherwise adequate for removing an adequate amount of heat.

Heat build-up in critical areas of housing 702 can be controlled by applying a material that reflects infrared radiation, visible light, and ultraviolet light to selected portions of the interior of housing 702. In the actual reduction to practice of the present invention by the inventor, it has been found that a strip of reflective aluminium foil having a paper backing (well known in the art) applied to top half 703 of housing 702 by conventional adhesive or other means directly above lamp 24 and reflector 25, and applied across the width of housing 702 prevents any distortion of a plastic housing that might occur from radiated or convected heat from lamp 24. Reflective foil 715 (FIGS. 18, 19, and 20) is attached to top half 703 of housing 702, permitting housing to be more compact because top half 703 can be physically closer to lamp 24 and reflector 25. Such reflective foil, or other reflective means, may be advantageously applied to any other hot spots found in a high intensity illumination system according to the present invention.

Figure 26:
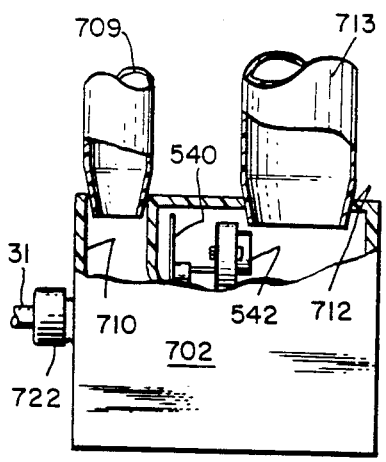
FIG. 26 is a top plan view of an illumination system according to the present invention illustrating the ventilation ducts and their relation to the housing.

Referring to FIG. 26, Exhaust ventilation duct 709, having a tapered insertion end, is inserted into exhaust port 710, and ventilation inlet duct 713, having a tapered insertion end, is inserted into housing air inlet 712, providing means for a complete circuit for ventilation air. Ventilation ducts 709, 712 may be as long as necessary to insure that adequate ambient air of suitable low temperatures is readily available in sufficient quantities. In some applications, for example, it may be desirable to bury the illumination system in the ground (providing a manhole-type cover for maintenance access) that do not permit the free flow of air. Ventilation ducts 709, 712 can then be run to a place that free flowing air is available. Ventilation ducts 709, 712 forty feet in length and more have been used successively with the present invention as disclosed herein.

The apparatus of FIG. 17 includes other elements of the illumination system according to the present invention, including a power supply, which conveniently may be transformer 52. In the preferred embodiment disclosed herein, transformer 52 is a step-down transformer that converts standard 115 volt power to 24 volts to illuminate lamp 24. Lamp 24 may have a voltage rating of 17 volts and a transformer producing 17 volts may be used. It has been found, however, that a 24 volt power supply produces a whiter light from lamp 24 than 17 volts does. When supplied with 24 volts, such a lamp consumes approximately 200 watts of electrical power. If desirable, lamps consuming up to about 500 watts of electricity or more can be employed in the present invention without adversely affecting light conduit 30.

Transformer 52 may be replaced by any suitable electrical power supply capable of meeting the power needs of lamp 24, such as, for example, a solid state power supply (not shown). A solid state power supply would be more compact than transformer 52, permitting use of a smaller housing.

Cooling fan 42 is driven by electric motor 48, which rotates cooling fan 42 at a rate determined by the design of electric motor 48, and may conveniently be any speed greater than about 500 RPM, although in a preferred embodiment, the rate of rotation is about 3,000 RPM.

Color wheel 540 is disposed between fan 42 and light-receiving end 32 of light conduit 30 so that color wheel 540 is cooled by air from fan 42, while at the same time coloring the light received by light conduit 30 in order to provide pleasing colors and changes of colors of the light transmitting by light conduit 30. Color wheel 540 is rotated by motor 542 at a rate of about 2 RPM. Naturally the rate of rotation of color wheel 540 may be adjusted by selecting a motor having a different rate of rotation, or by using a gear reduction system having different ratios than the gear reduction system employed in color wheel 540 drive motor 542.

Color wheel 540 and color wheel drive motor 542 are off-set from reflector 25 so that only a band along the outer circumference of color wheel 540, having the same width as the diameter of light conduit 30 being used in a specific application passes by light-receiving end 32 of light conduit 30. That is, only the radially outermost portion of color wheel 540 overlaps the line of sight from lamp 24 to light-receiving end 32 of light conduit 30, and entends only enough so that color wheel 540 filters (and colors) most of the light striking light-receiving end 32 of light conduit 30. This arrangement of the parts provides the least interference with the flow of cooling air through cooling duct 700. Thus, an illumination system according to the present invention having a color wheel also enjoys the substantial benefits of the lower operating temperatures inside the housing that are conferred by the cooling system described above.

Fan 42 is likewise off-set from lamp 24, so that, while cooling fan 42 is aligned with cooling duct inlet 704, as described above, only the outermost portion of the circumference of cooling fan 42 blades pass between lamp 24 and light-receiving end 32 of light conduit 30. The radially outermost portion of most fans, including cooling fan 42, move more air than any other portion of the fan blade, and at greater velocity. Accordingly, the arrangement just described provides the greatest amount of the fastest moving air that fan 42 can provide directly onto the end of glass envelope 716, which houses light-receiving end 32 of light conduit 30. This creates and maintains continued high turbulence in the air surrounding the end of glass envelope 716 that is inside housing 702.

Housing 702 may conveniently be molded in one piece of any convenient material, such as Lexan (Registered Trademark) or other suitable material, preferably having a white color to reflect light and further reduce heat build-up within housing 702. As illustrated in FIG. 17, housing 702 may be conveniently molded in two sections, upper section 703 (illustrated in FIGS. 18, 19, and 20) and lower section 701 (illustrated in FIGS. 17-20), and the two sections then joined together by means of adhesive or threaded fasteners, as is well known in the art. Fittings and support structures for mounting internal components of the illumination system are preferably molded into housing 702, providing for ready assembly and easy maintenance.

Craddle fingers 714, molded as integral members of housing 702, firmly support and control glass envelope 716, as is illustrated in FIGS. 17, 18, 19, and 21. Two craddle fingers 714 are molded into bottom section 701 of housing 702 and two opposed craddle fingers 714 are molded into top section 703 of housing 702. During assembly, glass envelope 716 is rested on the craddle fingers in bottom section 701 of housing 702, and then top section 703 is joined to bottom section 701, forming a complete housing 702 and the clamping action of the opposed craddle fingers 714 holds glass envelope firmly in place.

Figure 18:
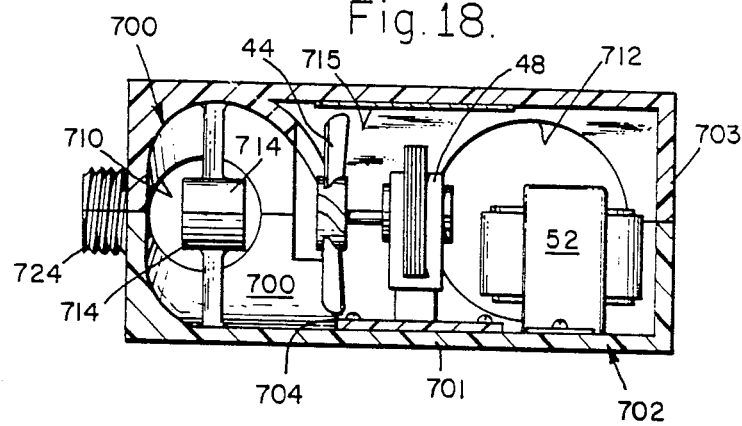
FIG. 18 is a section taken along lines 18—18 of FIG. 17.
Figure 19:
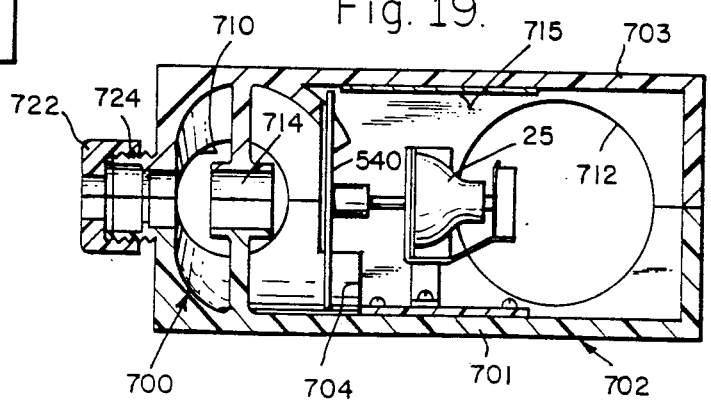
FIG. 19 is a section taken along lines 19—19 of FIG. 17.

In addition, threaded projection 724, which conveniently may be molded as an integral part of housing 702 and also may have an upper section and a lower section, as illustrated in FIGS. 18, and 19, provides an additional clamping on glass envelope 716. If desired, an adhesive that will stick to glass and to plastic may be applied to craddle finger 714 and to the interior surfaces of threaded projection 724.

Glass envelope 714, which encloses light-receiving end 32 of light conduit 30, is sealed by the action of stopper 718 as is illustrated in FIG. 21. Stopper 718 is tapered inwardly, in basically the shape of a flask stopper in common use in chemical laboratories. Tightening threaded cap 722, which mates with threaded projection 724 (through which glass envelope 714 passes, squeezes stopper 718 tightly against the inside of glass envelope 716 and against light conduit 30, thereby creating an air tight seal about light-receiving end 32 of light conduit 30. Stoppers 718 may be manufactured in a variety of sizes to accommodate different diameters of glass envelopes 716 (Glass envelopes 716 according to the preferred embodiment disclosed herein are in the shape of a glass tube) and different diameters of light conduits 30.

In some applications, such as the spa illumination system illustrated in FIG. 10 and the sign illustrated in FIG. 10, it is desirable to light a plurality of light conduits from one source. This objective is easily accomplished by the present invention, wherein either glass-type or plastic-type light conduits may be gathered into a bundle and inserted into glass envelope 716. In such case stopper 718 may be made of sufficiently pliable material that the central aperture therethrough conforms sealingly to the shape of the bundle. Alternatively, the stopper may include a plurality of holes through it, each hole receiving one or more of the individual strands of light conduit.

An alternative embodiment of a means for sealing glass envelope 716 is illustrated in FIG. 22, which includes O-ring 730 for sealing light conduit 30 within glass envelope 716 (not shown). O-ring 730 may conveniently be sized to fit snugly over the outside diameter of light conduit 30, and to substantially fill channel 725 on inside lip 727 of threaded cap 729.

The system of enclosing light-receiving end 32 of light conduit 30 within an air-tight glass envelope has several significant benefits, which include: (1) End 32 of light conduit 30 is protected from being pushed into fan blades 42, reducing the chances of damaging the apparatus; (2) the heat that end 32 of light conduit 30 is exposed to is reduced because the glass insulates light conduit 30 from the heat to a certain extent, and the glass may be coated with a heat absorbing coating, such as a dichroic coating, to reduce the amount of heat that light conduit 30 is subjected to; and (3) sealing light conduit 30 within glass envelope 714 radically reduces the amount of oxygen available to oxidize light conduit 30. This is particularly important when a polymer based light conduit is employed in the illumination system. In this case, the oxygen sealed within glass envelope 30 quickly reacts with the polymer light conduit and is exhausted. There is not, however, sufficient oxygen to cause significant oxidation and therefore deterioration of the light conduit, so the life of the polymer light conduit is greatly increased.

All O-rings, gaskets, stoppers, or other fixtures associated with glass envelope 716 must be made of a white or transparent material in order to reflect light that is transmitted through the sidewalls of glass envelope 716. Otherwise, and especially if such parts are black, they will absorb too much of the light transmitted through the sidewalls of the glass envelope, convert much of that light to heat, and literally burn up. It is for this and related reasons, especially the lift expectancy of the light conduit, for example, that it is important to distinguish the present invention from other illumination systems for light conduit lighting arrangements that only involve low light levels and do not employ high-intensity lamps. Only when one attempts to employ high-intensity lamps to increase the amount of light that a system can transmit does one encounter the problems that are addressed and solved, for the first time, by the present invention.

FIG. 23 schematically illustrates the spatial relationships between lamp 24, reflector 25, cooling fan 42, color wheel 540, and light-receiving end 32 of light conduit 30. Dotted lines 732 illustrate the focusing of light from lamp 24 by reflector 25 into a cone (the actual light and focusing occur in three dimensions, while the drawing of FIG. 23 illustrates it in two dimensions) having a focal point. The diameter of the actual focal point or spot is a characteristic of the design of reflector 25 and can be adjusted to suit a particular specification, by one skilled in the art. The parts are spaced from one another so that they are all grouped near focal point 734, with focal point 734 falling nearly on color wheel 540, which is spaced as nearly as practical to light receiving end 32 of light conduit 30. This remains true for a light conduit sealed in a glass envelope, as described above. Fan blade 42 is located slightly closer to reflector 25 than is focal point 734. The basic objective of the inventive arrangement of these parts is to maximize the proportion of available light that is received by light conduit 30, while providing adequate cooling.

Reflector 25 focuses infrared radiation, as well as visible light, and having cooling fan 42 near focal point insures that most of that infrared will be converted to heat and exhausted without reflecting throughout housing 702, thereby additionally reducing the heat build-up.

FIG. 24 illustrates a mechanical light attenuation member consisting of rotating shutter 740 comprising opaque spiral mask 744 permanently applied by paintining, enameling, or other suitable method, to circular disk 745 having shaft 742 fixedly attached thereto by conventional means. Rotating shutter 740 is located within housing 702 in the place of color wheel 540 when it is desired to control easily the amount of light available to light-receiving end 32 of light conduit 30. In use, rotating shutter 740 is rotated by turning knob 743, which is attached to shaft 742, to cause more or less of opaque spiral 744 to obscure light from light-receiving end 32 of light conduit 30. Shaft 742 may be turned by hand, so that the amount of light available to the light conduit can be set to provide a desirable level of light output from light conduit 30, which can be changed on demand, or may be attached to a motor, such as the motor that rotates the color wheel, thereby providing continuously varying levels of light output from light conduit 30 for aesthetic appeal, such as simulated strobe lights. Rotating shutter 740 does not change the color temperature of the light striking light-receiving end 32 of light conduit 30, which any light filter or voltage regulator operating on lamp 24 would do. The ability of rotating shutter 740 to reduce the amount of light transmitted through light conduit 30 without changing the color temperature is a significant advantage.

Circular disk 745 may be made of glass, plastic, or the like. Alternatively, it has been found that an opaque rotating shutter made of metal, for example, steel or similar material, cut-out in the shape of opaque mask 744 provides the desired light attenuation and does not deteriorate in the heat. Moreover, by forming a rotating shutter in the shape of the spiral, adequate cooling of light-receiving end 32 of light conduit 30 is assured.

FIG. 25 illustrates a high-intensity illumination system for a light conduit illumination system having three distinct sets of lamps 24, reflectors 25, color wheels 540, light conduits 30, and associated hardware, including power supplies, and so forth. Illumination systems such as these are useful when it is desired to have one centrally located unit supply lighting needs that require more than one light conduit. Such an apparatus simplifies installation and maintenance, and simplifies manufacture because only one housing 746, one cooling duct 748, and one cooling fan 750 are required. Each of these three elements must be large enough to accommodate the physical dimensions of the three lamps, reflectors, and light conduits.

Referring to FIG. 16, an embodiment of the present invention suitable for medical applications is disclosed. In use, light conduit 634 may have its distal end 640 operatively connected to a medical or other device, such as an endoscope, or the like, represented by device 644. The embodiment of FIG. 16 has wide use for medical applications and devices which require high-intensity light sources. The illumination system of FIG. 16 does not include a color wheel, since in medical and other applications is desirable to use white light having a color temperature as close to daylight as possible. Thus the illumination system without a color wheel has two advantages for applications requiring white light: (1) No color filters or transparent color wheel attenuates the light striking light-receiving end 32 of light conduit 30; and (2) light-receiving end 32 of light conduit 30 can be placed nearer the actual focal point of the light beam from lamp 24 and reflector 25. Naturally, a cooling duct such as cooling duct 700 (FIG. 17) may advantageously be used when white light is desirable, such as in the embodiment of FIG. 16, permitting use of even higher intensity lamps.

In connection with the illustrations of FIGS. 15 and 16, the following is typical illumination for the fiber optics bundle which is fabricated with glass fiber optics. The glass fiber optics, in the preferred embodiment, can have a 0.66 numerical aperture and be formed of 2-mil-diameter fibers. Typically, the fibers are bundled together in a protective sheath made of rubber. The terminations at the bundle ends of the fiber optics bundle are epoxied in various types of ferrules.

Typical specifications for plastic fiber optics, or light conduits, which can be utilized in practicing this invention can have diameters which vary from about 1/16 inch in diameter to about ⅜ of an inch in diameter or more. The plastic fiber optics, or light conduits, can have low heat resistant temperatures from about 180 degrees F. to about 200 degrees F. Temperatures above 200 degrees F. begin to break down the plastic fiber optics bundle. The plastic fiber optics can be made from various materials, such as styrene or polymethylmethacrylate, as is well known in the art. The plastic fiber optics are manufactured by use of extruding techniques, although other manufacturing techniques could be used. Manufacturers of plastic fiber optics which can be utilized in practicing this invention are Polyoptical (Polyoptics), DuPont (Crofon), and Mitsubishi (Eska).

Light conduits illustrated in the drawing figures may be of either plastic (polymerized)-type, or of glass. In either case, the light conduit is usually coated during manufacture or covered with a cladding or sheath. As illustrated in FIG. 17, for example, light conuit 30 is enclosed in sheath 31. Sheath 31 may be any suitable plastic material and may be any desired color. Light leaks from the sidewalls of most plastic-type light conduit, in amounts that can be controlled to some extent by the exact material used, the methods of manufacture used, the type of coating used, and other factors that are beyond the scope of this patent, but are well known in the art. It has been found that Teflon (Registered Trademark) provides a suitable material for extruding tubing suitable for use as sheath 31. The drawing figures may also, however, be interpreted as illustrating bundles of glass fiber optics, since each individual glass fiber must be individually enclosed in a protective sheath, but additionally a bundle of such glass fibers must also be enclosed in a larger outer sheath to protect the delicate glass fibers.

In applications utilizing a color wheel arrangement as a light-attenuating member, the color wheel can be made of standard acrylic or polycarbonate materials. Color gels may be Roscoe Gels which are glued together or secured to the wheel by clips. As illustrated in connection with FIG. 5, the color wheel is designed to permit air to pass through it such that when the fan blows air directly onto the color wheel, the tips of the fan blade cause the air to be very turbulent near the color gel area, thereby cooling the same and preventing the color gels or the color wheel from deforming or melting. In typical applications, the motor driving the color wheel would rotate at about 2 RPM, but speeds of rotation at less than 2 RPM or slightly in excess of 2 RPM can likewise be used without any deleterious effect to the light or the color wheel and associated light filters, whether they are color gels or other filters.

The high-intensity light source of the present invention can be fabricated for above-ground use in a portable unit by utilizing a source box made of very high-impact and very heat-resistant plastic material. Above-ground portable light sources formed of plastic can be utilized in portable spas and the like. The optical material utilized in such an arrangement can have a one-inch diameter and can be utilized with a color lens arrangement. The lamps which are utilized in the preferred embodiment may be high-intensity lamps which have light temperatures in the order of 3300 degrees K. to about 3400 degrees K. The temperature at the fiber optics face is on the order of 200 degrees F. In the absence of a fan and cooling duct using the teachings of the present invention, the temperature at light-receiving end 32 of light conduit 30 may be on the order of 600 degrees F. or higher.

A fan that can be used for the cooling fan in practicing the present invention is manufactured by Thorgren and is referred to as a "Lexan Clear Fan Blade," which is made of a substantially transparent material that will not melt or deform in the apparatus described in this application.

The high-intensity light source described herein has a wide range of applications not disclosed herein in detail. The high-intensity light source can be utilized for a projector, as light sources for wide range of types of fiber optics, for pools, spas, or any other applications in which cool non-electric light is desirable. Also, the high-intensity light source can be used in theaters, stages, and the like. In such applications, the present invention permits use of standard theater light filter gels to control the color of the light.

In addition, the teachings of the present invention can be utilized in a number of applications, such as projector light, decorative lamps, and other applications which require cool light that will not heat surfaces it strikes.

Although the preferred embodiments of the invention have been illustrated and described, it is apparent that these can be modified by those skilled in the art and that the scope of the invention is not intended to be restricted to any particular form or arrangement, or to any specific embodiment disclosed herein, or any specific use, since the present invention may be modified in various particulars or relations without departing from the spirit or scope of the claimed invention shown and described herein, of which the apparatus shown is intended only for illustration and for disclosure of an operative embodiment and not to show all of the various forms or modifications which might embody the invention.

The invention has been described in considerable detail in order to comply with the patent laws by providing a full public disclosure of one of its forms. Such detailed description is not, however, intended to limit the broad features or principles of the invention, or the scope of the patent property to be granted.

What is claimed is:

1. A light source for a light conduit illumination system, comprising:
    (a) a housing having sidewalls and a top and a bottom;
    (b) a high-intensity lamp mounted within said housing;
    (c) at least one light conduit having two ends, one said end being a light-receiving end, the other said end being a transmitting end, said light-receiving end being disposed within said housing on a line-of-sight with said lamp;
    (d) a concave light focusing reflector disposed adjacent said light source along said line-of-sight such that said lamp is between said light-receiving end of said light conduit and said lamp, for focusing the light from said light source at a focal point remote from said light source, with said light-receiving end of said light conduit being disposed near said focal point;
    (e) a light-transmitting envelope enclosing said light-receiving end of said light conduit secured within said housing, and means for sealing said light-transmitting envelope, thereby preventing deterioration of said light conduit due to chemical reactions with air; and
    (f) a fan disposed between said lamp and said light-receiving end of said light conduit, said fan positioned to blow directly on said light-receiving end of said light conduit, and means for driving said fan.

2. The apparatus according to claim 1 further comprising a cooling duct within said housing, said cooling duct including a cooling duct air inlet disposed adjacent said fan so that said fan blows directly into said cooling duct air inlet, and said cooling duct terminating in an exhaust port in said sidewall of said housing.

3. The apparatus according to claim 2 wherein said cooling duct further includes an elbow between said cooling air inlet and said exhaust port and said cooling duct tapers from said elbow to said exhaust port.

4. The apparatus according to claim 3 wherein said elbow comprises substantially a ninety degree bend.

5. The apparatus according to claim 1 wherein said housing includes an air inlet in one said sidewall of said housing, for admitting ambient air from outside said housing.

6. The apparatus according to claim 2 wherein said housing includes an air inlet in one said sidewall of said housing, for admitting ambient air from outside said housing.

7. The apparatus according to claim 1 further comprising a color wheel disposed between said fan and said light-receiving end of said light conduit.

8. The apparatus according to claim 7 wherein said color wheel is disposed relative to said light-receiving end of said light conduit so that the circumferential edge of said color wheel is aligned with the edge of said light-receiving end of said light conduit that is farthest from the center of said color wheel.

9. The apparatus according to claim 7 further comprising means for rotating said color wheel.

10. The apparatus according to claim 1 further comprising an envelope for enclosing said light-receiving end of said light conduit, and means for sealing said light-receiving end of said light conduit inside said envelope, thereby preventing deterioration of said light-receiving end of said light conduit due to chemical reaction with ambient air.

11. The apparatus according to claim 10 further comprising:
    (a) an envelope consisting of a glass tube having one permanently sealed end and one open end;
    (b) a tapered stopper having an axially disposed aperture therethrough;
    (c) a threaded projection having an axially disposed aperature therethrough fixedly attached to one said sidewall of said housing and penetrating said housing and said cooling duct at a location intermediate said cooling duct air inlet and said elbow; and
    (d) a threaded cap adopted to cooperate with said threaded projection;
    (e) whereby said threaded cap is positioned along the length of said light conduit, said light receiving-end of said light conduit it inserted through said aperature of said stopper and into said glass tube, said stopper is inserted into said glass tube, and said threaded cap is screwed onto said threaded projection, thereby squeezing said stopper against said light conduit and the internal sidewalls of said glass tube, sealing said tube.

12. The apparatus according to claim 2 further comprising a ventilation exhaust port air detachably connected to said exhaust port.

13. The apparatus according to claim 5 further comprising a ventilation housing air inlet duct detachably connected to said housing air inlet.

14. A light-source for a light conduit illumination system, comprising:
 (a) a housing having sidewalls and a top and and a bottom, and further including a housing air inlet in one said sidewall;
 (b) a high intensity lamp mounted within said housing;
 (c) at least one light conduit having two ends, one said end being a light-receiving end, the other said end being a light-transmitting end, said light-receiving end being disposed within said housing on a line-of-sight with said lamp;
 (d) a means for focusing light from said light source along said line-of-sight and directing the focused light toward said light-receiving end of said light conduit;
 (e) a light-transmitting envelope enclosing said light-receiving end of said light conduit secured within said housing, and means for sealing said light-transmitting envelope, thereby reducing deterioration of said light conduit due to chemical reactions with air;
 (f) a fan disposed between said lamp and said light-receiving end of said light conduit, said fan being positioned to blow directly onto said envelope, and means for driving said fan;
 (g) a cooling duct within said housing, said cooling duct including a cooling duct air inlet disposed adjacent said fan so that said fan blows directly into said cooling duct air inlet, and said cooling duct terminating in an exhaust port in one said sidewall of said housing, said cooling duct further comprising an elbow intermediate said cooling duct air inlet and said exhaust port.

15. The apparatus of claim 14 further comprising at least one light conduit operatively connected to said housing and formed into a display sign.

16. The apparatus of claim 14 further comprising a color wheel mounted in said housing between said lamp and said light-receiving end of said light conduit, and means for rotating said color wheel.

17. The apparatus of claim 14 further comprising a rotating shutter mounted in said housing between said lamp and said light-receving end of said light conduit, and means for rotating said rotating shutter.

18. A light source for a light conduit illumination system, comprising:
 (a) a housing having sidewalls and a top and a bottom;
 (b) a light source mounted within said housing;
 (c) at least one light conduit having two ends, one said end being a light-receiving end, and the other said end being a light-transmitting end, said light-receiving end being disposed within said housing on a line-of-sight with said light source;
 (d) cooling means for cooling said light-receiving end of said at least one light conduit, said cooling means being mounted in said housing and disposed between said light source and said light-receiving end of said at least one said light conduit;
 (e) said cooling means further comprising a fan and a means for driving the fan;
 (f) a cooling duct having a cooling duct air inlet disposed adjacent said fan, said fan being positioned to blow into said cooling duct, and an exhaust outlet, for exhausting air from said housing;
 (g) an air inlet in a sidewall of said housing, for admitting ambient air from outside said housing as said fan blows air out of said housing through said cooling duct; and
 (h) said cooling duct further comprising an elbow having substantially a ninety degree bend disposed intermediate said cooling means and said exhaust outlet, and said cooling duct tapering from said elbow to said exhaust outlet.

19. The apparatus according to claim 18 wherein said air inlet includes at least as much as said exhaust outlet includes.

20. A light source for a light conduit illumination system, comprising:
 (a) a housing having sidewalls and a top and a bottom;
 (b) a light source mounted within said housing;
 (c) at least one light conduit having two ends, said one end being a light-receiving end, and the other said end being a light-transmitting end, said light-receiving end being disposed within said housing on a line-of-sight with said light source;
 (d) cooling means for cooling said light-receiving end of said at least one light conduit, said cooling means being mounted in said housing and disposed between said light source and said light-receiving end of at least one said light conduit;
 (e) a cooling duct having a cooling air inlet disposed adjacent said cooling means, and terminating in an exhaust port in a sidewall of said housing, said cooling means being disposed to move air into said cooling air inlet and through said cooling duct;
 (f) an air inlet in a sidewall of said housing, for admitting ambient air from outside said housing as said cooling means blows air out of said housing through said cooling duct; and
 (g) said cooling duct further comprising an elbow disposed intermediate said cooling duct air inlet and said exhaust port, and said cooling duct tapering from said elbow to said exhaust port.

21. The apparatus according to claim 20 wherein said air inlet includes at least as much area as said exhaust port includes.

22. A light source for a light conduit illumination system, comprising:
 (a) a housing having sidewalls and a top and a bottom;
 (b) a light source mounted within said housing;
 (c) at least one light conduit having two ends, one said end being a light-receiving end, and the other said end being a light-transmitting end, said light-receiving end being disposed within said housing on a line-of-sight with said light source and displaced therefrom such that a gap is created between said light source and said light-receiving end of said at least one light conduit;
 (d) cooling means for cooling the light-receiving end of said at least one light conduit, said cooling means further comprising an axial flow propeller-type impeller having a plurality of vanes extending radially therefrom and at a selected pitch, said impeller positioned relative to said gap between said source of light and the light-receiving end of said at least one light conduit such that when the impeller is rotated the radially extending vanes are transported through the gap and intercept the light being directed along the path from the light source to the light-receiving end of said at least one light conduit; and (e) means for driving said impeller.

23. The apparatus according to claim 22, wherein said impeller is rotated at a predetermined rate such that the interception of light by the plurality of vanes is visibly imperceptible to a user but the rotating impeller is able to displace air heated by the light source in a generally axial path relative to the impeller such that the heated air is directed away from the light source to form a negative pressure in the vicinity of the impeller such that ambient air located in the vicinity other than the light source and impeller is drawn into the negative pressure area, heated by the light source, and then displaced in response to rotation of the impeller so that the temperature of the air received by the light-receiving end of said at least one light conduit is cooler than the air heated by said light source.

24. The apparatus according to claim 23, wherein said impeller is rotating at a speed of between approximately 500 RPM and 3000 RPM.

25. The apparatus according to claim 22 wherein said light source further comprises a high-intensity incandescent lamp.

26. The apparatus according to claim 25 wherein said light source further comprises a reflector mounted in said housing and disposed on the line-of-sight connecting said light source and said light-receiving end of said at least one light conduit, such that said light source is between said reflector and said light-receiving end of said at least one light conduit.

27. The apparatus according to claim 26 wherein said reflector further comprises a concave focusing reflector disposed adjacent said light source for focusing the light from said light source at a focal point remote from said light source.

28. The apparatus according to claim 27 wherein said light-receiving end of said at least one light conduit is disposed at said focal point of said concave focusing reflector.

29. The apparatus according to claim 22 further comprising:

(a) a color wheel disposed between said light source and said light receiving end of said light conduit; and (b) said color wheel positioned along a predetermined path so that the plurality of rotating vanes on the impeller will rotate without hitting the color wheel.

30. The apparatus according to claim 29 wherein said color wheel is a rotatable member including a hub and an annular-shaped outer rim which contains the color segments of the color wheel, the apparatus further comprising means for driving the rotatable color wheel.

31. The apparatus according to claim 22 further comprising an envelope enclosing said light-receiving end of said at least one light conduit, and means for sealing said light-receiving end of said at least one light conduit inside said envelope, thereby preventing deterioration due to oxidation of said light conduit.

32. The apparatus according to claim 22 wherein said means for driving said impeller is an electric motor.

33. The apparatus according to claim 30 wherein said means for driving the rotatable color wheel is an electric motor.

34. The apparatus according to claim 22 wherein said vanes are transparent.

* * * * *